United States Patent
Huang et al.

(10) Patent No.: US 11,758,506 B1
(45) Date of Patent: Sep. 12, 2023

(54) NODE LOCATION SELECTION OF WIRELESS MESH NETWORKS

(71) Applicant: Meta Platforms, Inc., Menlo Park, CA (US)

(72) Inventors: Po Han Huang, Cypress, TX (US); Wuwei Cai, Fremont, CA (US); Pratheep Bondalapati, Woodland Hills, CA (US)

(73) Assignee: Meta Platforms, Inc., Menlo Park, CA (US)

(*) Notice: Subject to any disclaimer, the term of this patent is extended or adjusted under 35 U.S.C. 154(b) by 110 days.

(21) Appl. No.: 17/401,408

(22) Filed: Aug. 13, 2021

(51) Int. Cl.
*H04W 64/00* (2009.01)
*H04W 84/18* (2009.01)

(52) U.S. Cl.
CPC ......... *H04W 64/003* (2013.01); *H04W 84/18* (2013.01)

(58) Field of Classification Search
CPC ............................ H04W 64/003; H04W 84/18
See application file for complete search history.

(56) References Cited

U.S. PATENT DOCUMENTS

| | | |
|---|---|---|
| 2004/0083277 A1 | 4/2004 | Chaporkar et al. |
| 2017/0013413 A1* | 1/2017 | Singh ................ H04B 7/18506 |
| 2021/0250777 A1* | 8/2021 | Kounev ............... H04B 7/0413 |
| 2022/0329290 A1* | 10/2022 | Brown ................ H04B 7/0608 |

OTHER PUBLICATIONS

A Novel Gateway Selection Method to Maximize the System Throughput of Wireless Mesh Network Deployed in Disaster Areas; Wei Liu, Hiroki Nishiyama, Nei Kato, Yoshitaka Shimizu, and Tomoaki Kumagai; 2012 IEEE 23rd International Symposium on Personal, Indoor and Mobile Radio Communications—(PIMRC).
Concepts and Algorithms for Polygonal Simplification; Jonathan D. Cohen, Department of Computer Science, The Johns Hopkins University.
Hierarchical Sampling for Multi-Instance Ensemble Learning; Han-ning Yuan, Meng Fang, and Xingquan Zhu; IEEE Transactions on Knowledge and Data Engineering, vol. 25, No. 12, Dec. 2013.
Terragraph: Gigabit connectivity and backhaul in the 60 GHz mmWave; Monica Paolini, Senza Fili; 2021.

* cited by examiner

*Primary Examiner* — Jae Y Lee
(74) *Attorney, Agent, or Firm* — BakerHostetler

(57) ABSTRACT

Apparatuses, methods, and systems for node selection of wireless networks are disclosed. One method includes obtaining locations available for placing nodes, wherein each of the locations include three dimensions. For each pair of available locations, the method includes looking up two-dimensional locations of possible obstructions between the pair of available locations, identifying candidate obstructions from the possible obstructions based on two-dimensional locations of the possible obstructions and two-dimensional locations of the pair of available locations, estimating a reference height for a shortest distance between a segment between the pair of available locations and the three-dimensional location of each of the candidate obstructions, determining a distance between a point on the segment as defined by the reference height and the three-dimensional location of each of the possible obstructions, and identifying the pair of available locations as having a line-of-sight wireless link based the determined distance of each of the candidate obstructions.

20 Claims, 12 Drawing Sheets

In this step, calculate the height(s) (h, h') of the candidate obstructions which have the shortest distance to the segment connecting the pair of available node locations at (x1, y1, z1) and (x2, y2, z2)

Determine whether the distances 560, 660 are greater than the references radius. If yes, the a LOS Wireless link is designated between pair of available node locations.

Obtaining locations available for placing nodes of a wireless mesh network, wherein each of the locations include at least a longitude, a latitude, and an elevation
810

Looking up two-dimensional locations of possible obstructions between each pair of available locations
820

Identifying candidate obstructions from the possible obstructions based on the two-dimensional locations of the possible obstructions and two-dimensional locations of the pair of available locations
830

Estimating a reference height for a shortest distance between a segment between the pair of available locations and the three-dimensional location of each of the candidate obstructions
840

Determining a distance between a point on the segment as defined by the reference height and the three-dimensional location of each of the possible obstructions
850

Identifying the pair of available locations as having a line-of-sight wireless link based the determined distance of each of the candidate obstructions
860

FIGURE 8

NODE LOCATION SELECTION OF WIRELESS MESH NETWORKS

FIELD OF THE DESCRIBED EMBODIMENTS

The described embodiments relate generally to wireless communications. More particularly, the described embodiments relate to systems, methods, and apparatuses for node location selection of wireless mesh networks.

BACKGROUND

Planning of wireless network is a critical phase that occurs prior to deployment, especially for wireless backhaul networks. A key requirement of the network planning includes selecting which of possible node location will be utilized during operation of the wireless mesh network.

There is a need to identify where to place wireless mesh network nodes for building a cost-efficient and fully connected mesh backhaul network in the field. A cost-efficient network allows deployment of the fewest number of wireless mesh network nodes. Therefore, possible node locations that cover the most of demand sites and other possible locations (for future extension) should be selected.

It is desirable to have methods, apparatuses, and systems for node location selection of wireless mesh networks.

SUMMARY

An embodiment includes a method of node selection of wireless mesh networks. The method includes obtaining locations available for placing nodes of a wireless mesh network, wherein each of the locations include at least a longitude, a latitude, and an elevation. For each pair of available locations, the method further includes looking up two-dimensional locations of possible obstructions between the pair of available locations, identifying candidate obstructions from the possible obstructions based on the two-dimensional locations of the possible obstructions and two-dimensional locations of the pair of available locations, estimating a reference height for a shortest distance between a segment between the pair of available locations and the three-dimensional location of each of the candidate obstructions, determining a distance between a point on the segment as defined by the reference height and the three-dimensional location of each of the possible obstructions, and identifying the pair of available locations as having a line-of-sight wireless link based the determined distance of each of the candidate obstructions.

Another embodiment includes a system. The system includes a system server configured to obtain locations available for placing nodes of a wireless mesh network, wherein each of the locations include at least a longitude, a latitude, and an elevation. For each pair of available locations, the system server operates to look up two-dimensional locations of possible obstructions between the pair of available locations, identify candidate obstructions from the possible obstructions based on the two-dimensional locations of the possible obstructions and two-dimensional locations of the pair of available locations, estimate a reference height for a shortest distance between a segment between the pair of available locations and the three-dimensional location of each of the candidate obstructions, determine a distance between a point on the segment as defined by the reference height and the three-dimensional location of each of the possible obstructions, and identify the pair of available locations as having a line-of-sight wireless link based the determined distance of each of the candidate obstructions.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 8 is a flow chart that include steps of a method of determining line-of-sight between pairs of available locations for node placement, according to an embodiment.

DETAILED DESCRIPTION

The embodiments described include methods, apparatuses, and systems for node location selection of wireless mesh networks. For an embodiment, the selection is based on determining line-of-sight wireless links between possible node locations. An embodiment includes determining the available locations for possible node placements. From the available locations, determinations are made as to whether the available location provide possible line-of-sight (LOS) wireless links. For an embodiment, LOS wireless links are first determined using a two-dimensional analysis. Further, for an embodiment, additional LOS wireless links are determined using a three-dimensional analysis. Once the LOS wireless links for the available node locations are determined, node selections are made. An embodiment includes selecting a subset of the selected node locations based on the number of LOS wireless link of each of the available node locations. Further, an embodiment includes identifying stranded nodes that do not have an LOS wireless link and selecting additional nodes to provide LOS wireless links to the stranded nodes. For an embodiment, the nodes of the wireless network are deployed based on the node location selections.

The described embodiments in which LOS wireless link are identified using a two-dimensional analysis and then a three-dimensional analysis is much more time-efficient than a purely three-dimensional analysis. The efficiency is realized by splitting the selection process to two hierarchies: 1st hierarchy: leverage 2D LOS (latitude, longitude) to select some of the possible locations which can cover the most of demand sites and the other possible locations in the 2D domain. 2nd hierarchy: employ 3D LOS to those select possible locations and select those possible locations that can cover the most of demand sites and the other possible locations in the 3D domain.

Figure 1:
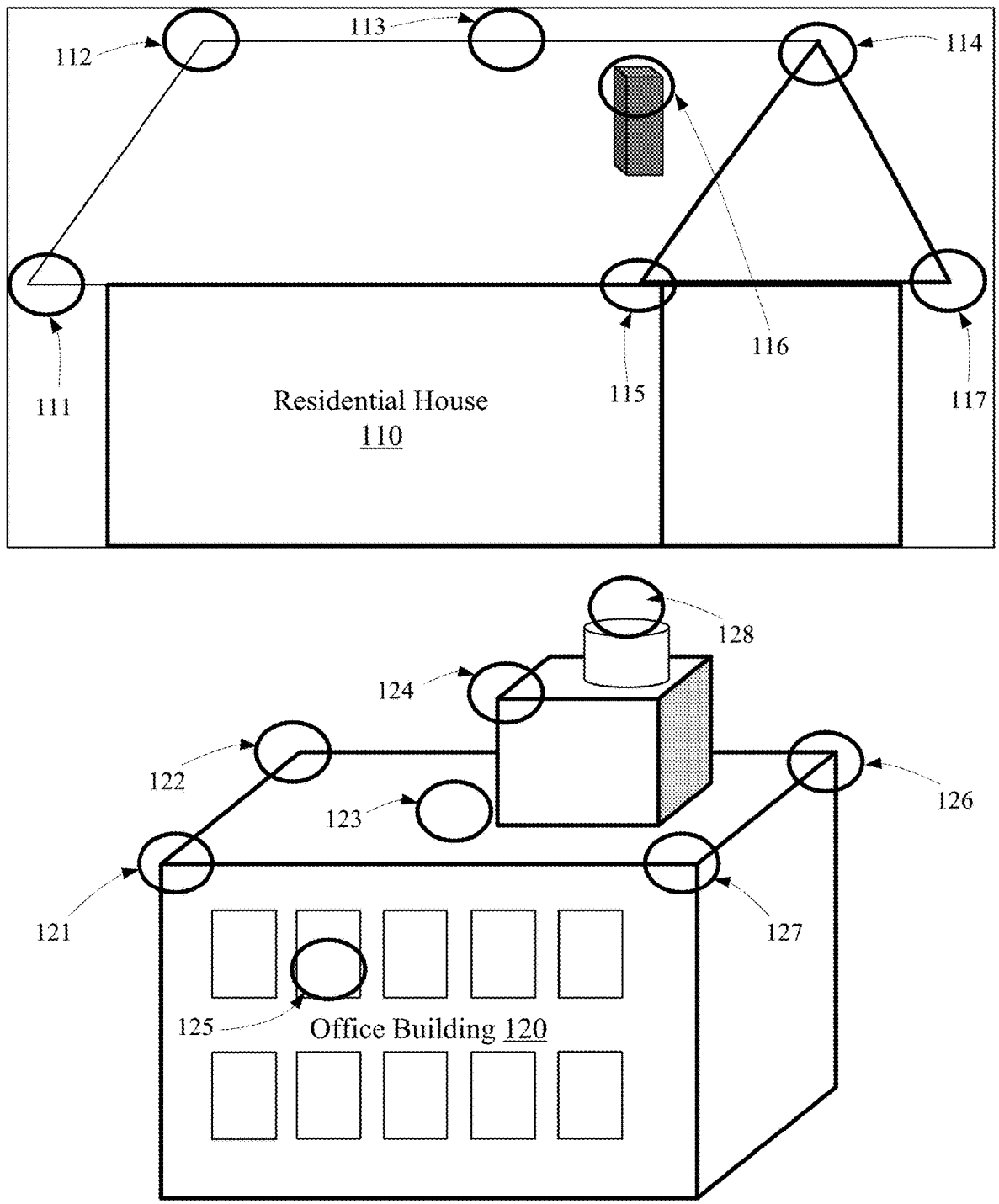
FIG. 1 shows examples of structures that may be used for placement of wireless mesh network nodes, according to an embodiment.

FIG. 1 shows examples of structures 110, 120 that may be used for placement of wireless mesh network nodes, according to an embodiment. The structures 110, 120 may include residential houses and/or office buildings. Each of the structures 110, 120 include possible node locations 111, 112, 113, 114, 115, 116, 117, 121, 122, 123, 124, 125, 126, 127, 128.

For at least some embodiments, many structures like the structures 110, 120 are located in a geographical region. Accordingly, the structures 110, 120 can be utilized to provide wireless node locations of a wireless mesh network. However, nodes placed in some of the locations will provide better wireless coverage than node placed in other locations. It is desirable to identify which of the locations to use in the deployment of a wireless mesh network.

For an embodiment, the node locations are selected based on line-of-sight (LOS) determinations. That is, some of the node locations are more adapted to providing a LOS wireless connection to other node locations. The process of determining LOS wireless connections can be an onerous process because of the possibility of a large number of possible node locations. The LOS determination can be determined using two-dimensional or three-dimensional locations of available node locations and possible obstructions located between the available node locations. Two-dimensional determinations are easier to process due to fewer variables but may not provide absolute LOS determinations. That is, the two-dimensional determinations may exclude some available node location that provide LOS wireless links. Three-dimensional determinations are typically more accurate and comprehensive but can be onerous due to computations that include more variables.

A least some of the described embodiments include first determining LOS wireless links through a two-dimensional analysis. Further, additional LOS wireless links are determined through a more comprehensive three-dimensional analysis.

Figure 2:
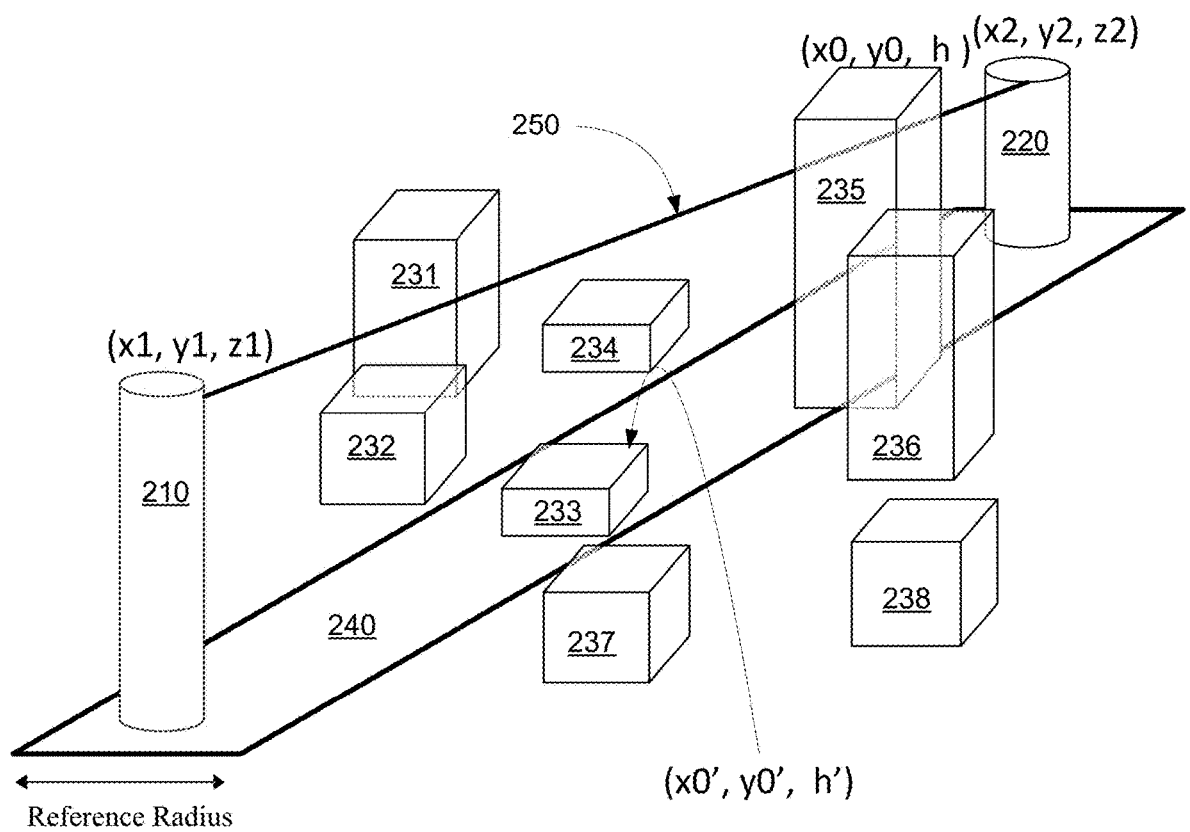
FIG. 2 shows a pair of available node locations, and possible obstructions to a line-of-sight (LOS) between the available node locations, according to an embodiment.

FIG. 2 shows a pair of available node locations 210, 220, and possible obstructions 231, 232, 233, 234, 235, 236, 237, 238 to a line-of-sight (LOS) 250 between the available node locations 210, 220, according to an embodiment. As previously described, locations available for node placements are determined. From the available locations, LOS determinations between each of the available locations are made. The available node locations 210, 220 are two (a pair) of the available locations. The LOS determination is made for all pairs of the available node locations. For an embodiment, the pairs of available node locations are limited to node location within a specified distance from each other. The LOS determination for each pair of available locations is made by identifying a possible direct wireless link (LOS) without obstructions between the pair of available locations.

As shown, a first location 210 of the pair has a three-dimensional location of (x1, y1, z1), and a second location 220 of the pair has a three-dimensional location of (x2, y2, y3). A determination needs to be made of any one of the possible obstructions 231, 232, 233, 234, 235, 236, 237, 238 would prevent a LOS wireless link between the first location 210 and the second location 220. A two-dimensional rectangle 240 provides a two-dimensional representation of the possible LOS wireless link between the first location 210 and the second location 220. Possible three-dimensional obstructions 233, 235 have two-dimensional locations and heights of (x0', y0', h') and (x0, y0, h).

Figure 3:
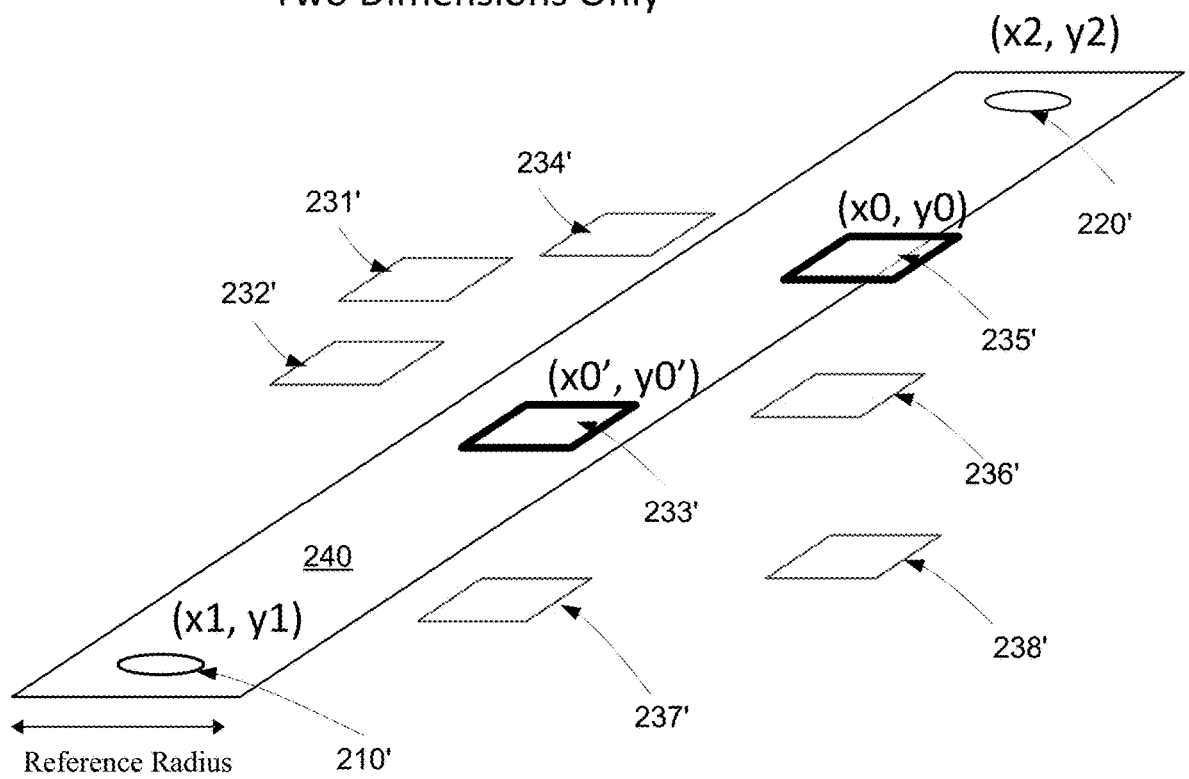
FIG. 3 shows a two-dimensional analysis of whether possible obstructions prevent a line-of-sight (LOS) between the pair of available node locations, according to an embodiment.

FIG. 3 shows a two-dimensional analysis of whether possible obstructions prevent a line-of-sight (LOS) between the pair of available node locations, according to an embodiment. Here, each of the pair of nodes 210', 220' are represented by two-dimensional locations (x1, y1), (x2, y2). Further, each of the possible obstructions 231', 232', 233', 234', 235', 236', 237' are represented by two-dimensional locations, such as the obstructions 233', 235' being represented by two-dimensional locations (x0', y0'), (x0, y0).

Here, based on the two-dimensional analysis, it can be determined that two-dimensional locations of the obstructions 233', 235' may prevent a LOS wireless link between the pair of available node locations 210', 220'. More specifically, whether the two-dimensional locations of the obstructions 233', 235' fall within the two-dimensional rectangle 240 defined by the locations of the pair of available node locations 210', 220' and a reference radius.

For an embodiment, the reference radius can be defined as a "Fresnel radius", or "maximum radius of the first Fresnel zone". For an embodiment, the Fresnel radius is determined by:

$$F_R = \frac{1}{2}\sqrt[2]{\frac{cD}{f}},$$

where c is the speed of light, D is the distance between the pair of nodes, and f is the frequency of the wireless communication between the nodes. Accordingly, for an embodiment, the reference radius is selected based on the distance D between the pair of nodes and the frequency f of the wireless communication between the nodes.

For an embodiment, if the two-dimensional analysis indicated that the possible obstructions do not prevent a LOS wireless link between the pair of available node locations, then a LOS wireless link is designated between the pair of available locations, and the LOS processing of this particular pair of available node locations is stopped. However, as shown in FIG. 3, the two-dimensional locations of the obstructions 233', 235' may prevent a LOS wireless link between the pair of available node locations 210, 220. Therefore, the LOS determination proceeds to a three-dimensional analysis to determine whether the potential obstructions 233', 235' prevent a LOS wireless link between the pair of available node locations 210, 220.

The described two-dimensional LOS analysis may save a large amount of processing because at least some of the LOS wireless link determination are made without having to do a three-dimensional analysis which uses much more processing power. Further, as described, the initial two-dimensional analysis is only performed on pairs of available node locations that are within a specified distance from each other.

Figure 4:
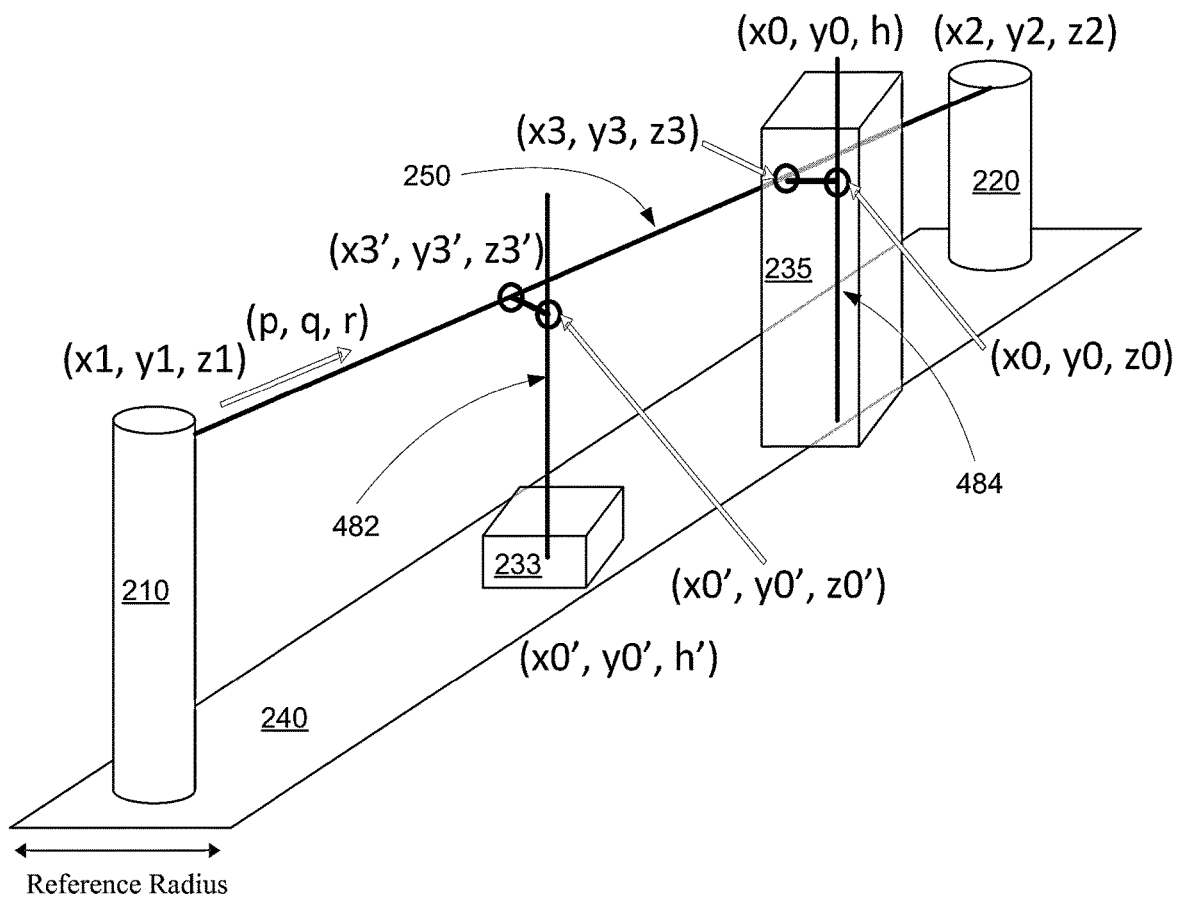
FIG. 4 shows a first step of a three-dimensional analysis of whether obstructions prevent a line-of-sight (LOS) between the pair of available node locations which includes determining a reference height of each of the possible obstructions that has a shortest distance to a segment connecting the pair of available node locations, according to an embodiment.

FIG. 4 shows a first step of a three-dimensional analysis of whether obstructions prevent a line-of-sight (LOS) between the pair of available node locations which includes determining a reference height (z0, z'0) of each of the possible obstructions 233, 235 that has the shortest distance to a segment 250 connecting the pair of available node locations 210, 220, according to an embodiment. As shown, the segment 250 (which would be a LOS wireless link if one exists) connects the pair of available node locations 210, 220. Further, it is to be observed that three-dimensional LOS wireless analysis is being determined on only the obstructions 233, 235 because the two-dimensional analysis determined that the obstructions 231, 232, 234, 236, 237 do not impede a LOS wireless link between the pair of available node locations 210, 220. Therefore, the three-dimensional analysis only needs to be performed on the obstructions 233, 235

As shown in FIG. 4, determining the references heights z0, z'0 includes determining the shortest distance between lines 482, 484 that extends in the third dimension (Z) from a center point of each of the potential obstructions 233, 235, and the segment 250. As shown, the shortest distance between the line 482 and the segment 250 connects at the line 482 at coordinates of x0', y0', z0', and connect at the segment 250 at x3', y3', z3'. Further, as shown, the shortest distance between the line 484 and the segment 250 connects at the line 484 at coordinates of x0, y0, z0, and connect at the segment 250 at x3, y3, z3. A vector (p, q, r) is directed along the LOS link (segment) between the pair of available nodes.

Figure 5:
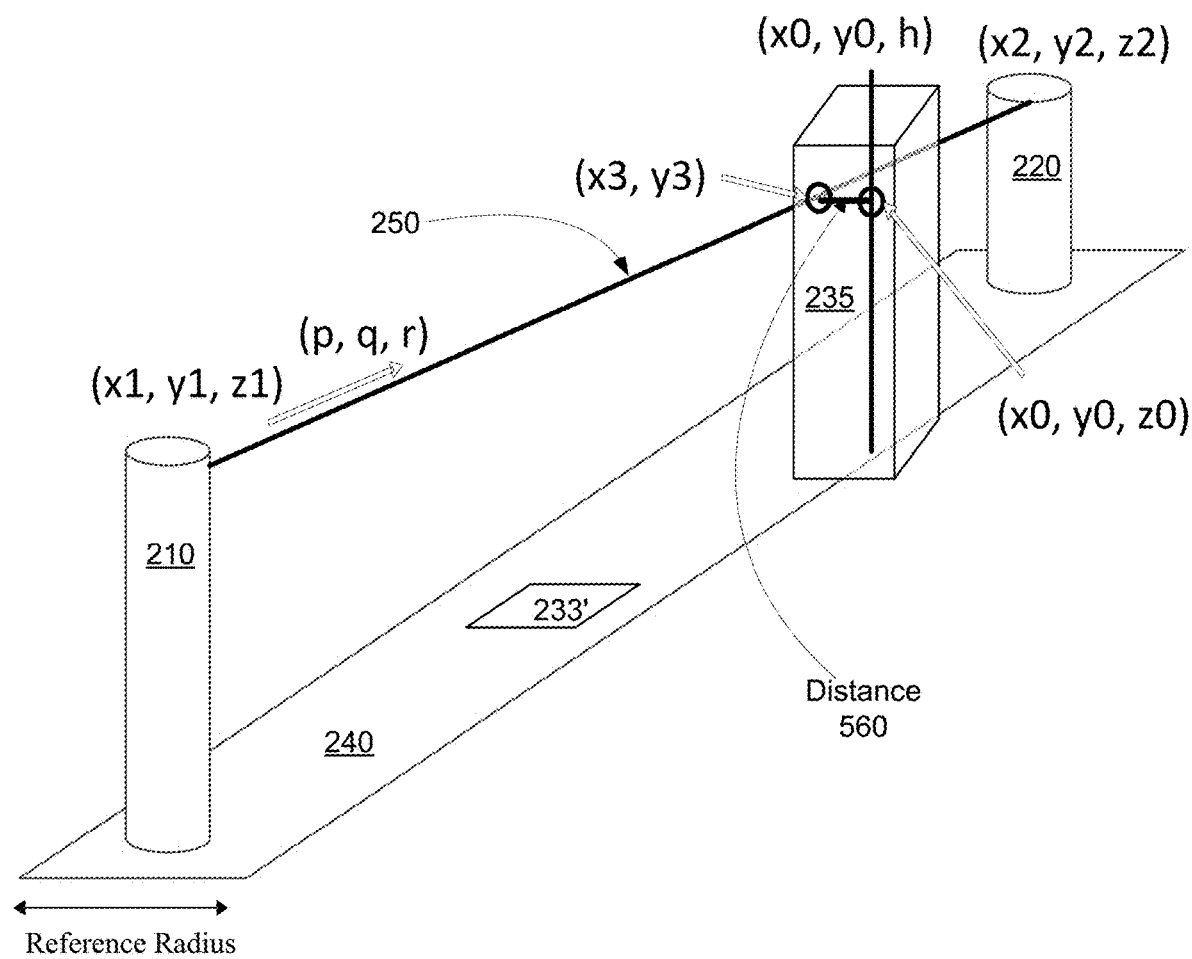
FIG. 5 shows a determination of a distance between a point on the segment as defined by the reference height and the three-dimensional location of a first possible obstruction, according to an embodiment.

FIG. 5 shows a determination of a distance 560 between a point on the segment 250 as defined by the reference height and the three-dimensional location of a first possible obstruction, according to an embodiment. The distance 560 determination is made between the coordinates x0, y0, z0, and x3, y3, z3.

Figure 6:
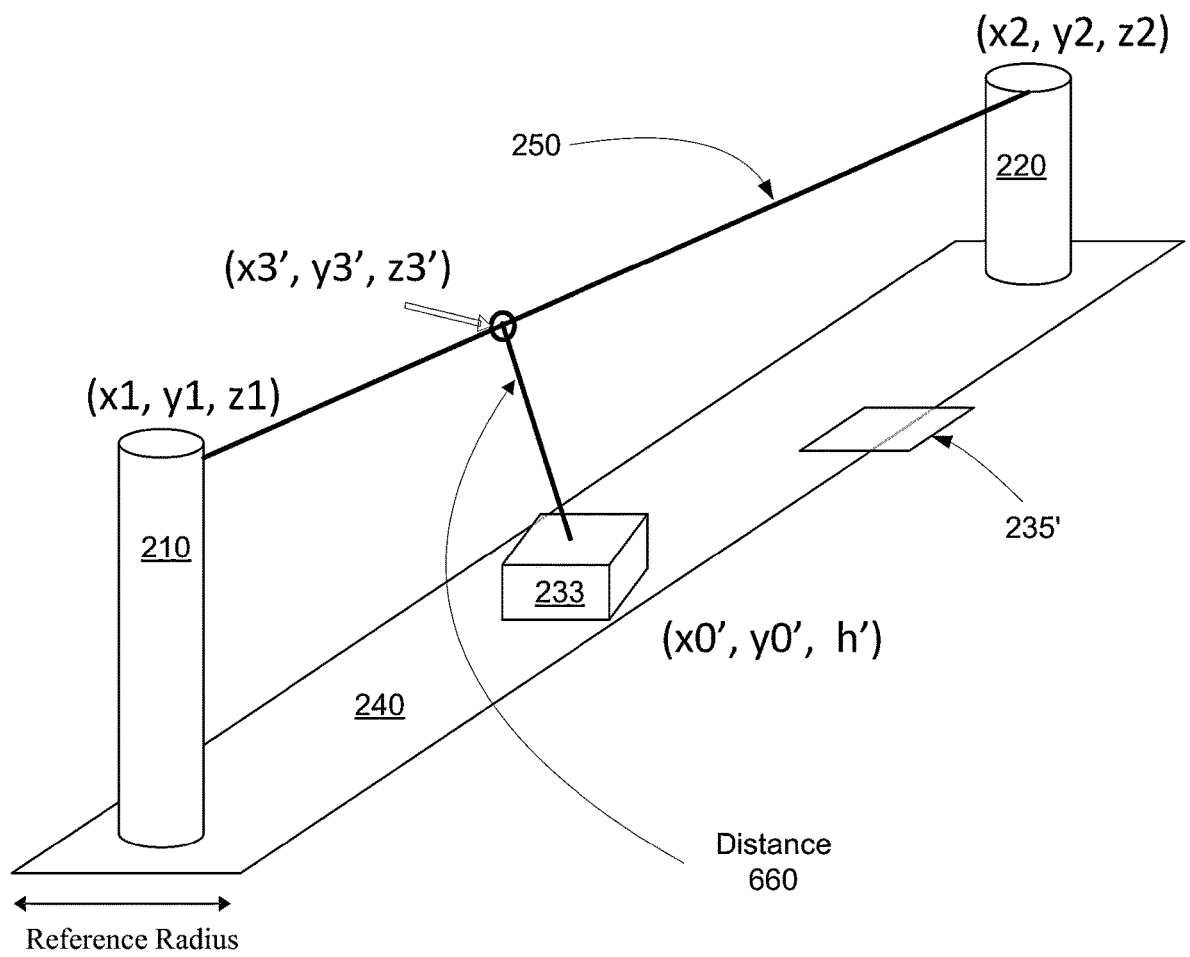
FIG. 6 shows a determination of a distance between a point on the segment as defined by the reference height and the three-dimensional location of a second possible obstruction, according to an embodiment.

FIG. 6 shows a determination of a distance 660 between a point on the segment 250 as defined by the reference height and the three-dimensional location of a second possible obstruction, according to an embodiment. The distance 660 determination is made between the coordinates x0, y0, h', and x3', y3', z3'.

Figure 7:
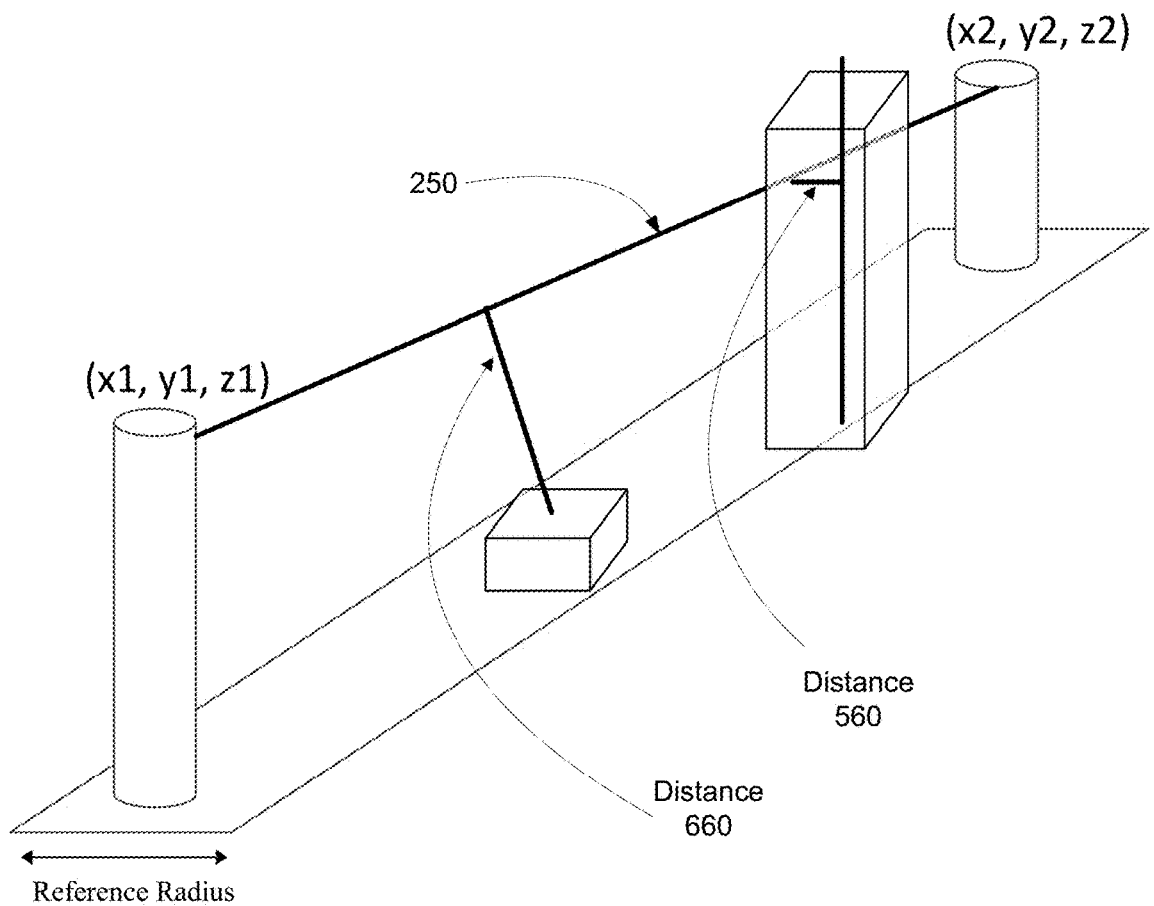
FIG. 7 shows a determination of whether a line-of-sight (LOS) wireless link exists between the pair of available locations based on whether the distance between the point on the segment as defined by the reference height and the three-dimensional location of each of the possible obstructions is greater that a reference radius, according to an embodiment.
Figure 9:
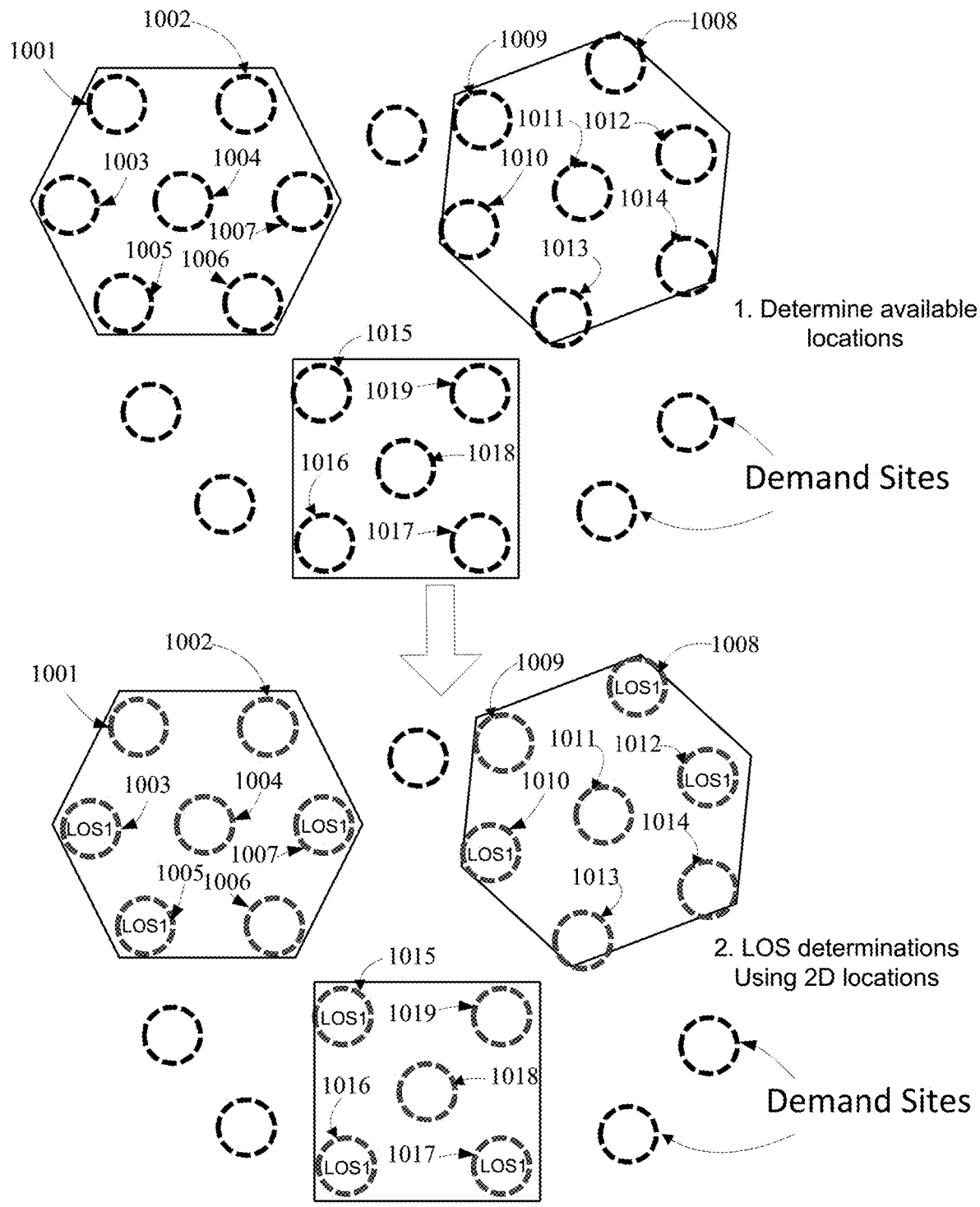
FIG. 9 shows available locations for placing nodes of a wireless mesh network, and line-of-sight (LOS) nodes of the available locations which are determined using a two-dimensional analysis, according to an embodiment.

FIG. 7 shows a determination of whether a line-of-sight (LOS) wireless link exists between the pair of available locations 210, 220 based on whether the distance 560, 660 between the point on the segment as defined by the reference height and the three-dimensional location of each of the possible obstructions 233, 235 is greater that a reference radius, according to an embodiment. As previously described, for an embodiment, the reference can be defined as a "Fresnel radius", or "maximum radius of the first Fresnel zone". As previously described, for an embodiment, the Fresnel radius is determined by the distance D between the pair of nodes, and the frequency (f) of the wireless communication between the nodes.

FIG. 8 is a flow chart that include steps of a method of determining line-of-sight between pairs of available locations for node placement, according to an embodiment. A first step 810 includes obtaining locations available for placing nodes of a wireless mesh network, wherein each of the locations include at least a longitude, a latitude, and an elevation. A second step 820 includes looking up two-dimensional locations of possible obstructions between the pair of available locations for each pair of available locations. A third step 830 includes identifying candidate obstructions from the possible obstructions based on the two-dimensional locations of the possible obstructions and two-dimensional locations of the pair of available locations. As described, if no obstructions are identified based on the two-dimensional analysis, then there is a LOS wireless link between the pair of nodes. However, if the two-dimensional analysis indicates possible (candidate) obstructions, then the three-dimensional analysis is performed on the candidate obstructions to more precisely determine if the candidate obstructions obstruct a LOS wireless link between the pair of available locations.

A fourth step 840 includes estimating a reference height for a shortest distance between a segment between the pair of available locations and the three-dimensional location of each of the candidate obstructions. A fifth step 850 includes determining a distance between a point on the segment as defined by the reference height and the three-dimensional location of each of the possible obstructions. A sixth step 860 includes identifying the pair of available locations as having a line-of-sight wireless link based the determined distance of each of the candidate obstructions.

For an embodiment, identifying the pair of available locations as having a line-of-sight wireless link based the determined distance of each of the possible obstructions includes identifying the pair of available location as having the LOS (line-of-sight) wireless link if the determined distance for each of the candidate obstructions is greater than the reference radius. That is, if the three-dimensional analysis indicates center locations of the candidate obstructions are greater than the reference distance from the LOS wireless link, then the candidate obstruction do not obstruct the LOS wireless link.

For at least some embodiments, identifying candidate obstructions from the possible obstructions based on the two-dimensional locations of the possible obstructions and two-dimensional locations of the pair of available locations further includes identifying two-dimensional coverage areas of the possible obstructions, identifying candidate obstructions as possible obstructions that have two-dimensional coverage areas that overlap a two-dimensional approximation of a line-of-sight between the pair of available locations. That is, overlapping of the coverage areas suggests that the overlapping possible obstruction is a candidate obstruction, and the three-dimensional analysis should be performed to determine whether the candidate obstruction is an actual obstruction.

For an embodiment, if the two-dimensional coverage areas do not overlap with the two-dimensional approximation of a line-of-sight between the pair of available locations, then the pair of available location are identified as having a LOS (line-of-sight) wireless link. Therefore, the three-dimensional analysis does not need to be performed for this pair of available location because there are no candidate obstructions.

At least some embodiments further include first selecting node placements for the available locations based on a number of line-of-sight wireless links associated with each of the available locations. At least some embodiments include first selecting node placements for the available locations that have greater than a threshold number of line-of-sight wireless links. At least some embodiments include first selecting node placements for the available locations for the available locations have the greatest number of line-of-sight wireless links. At least some embodiments include first selecting node placements for the available locations for N of the available locations that have the greatest number of line-of-sight wireless links. That is, the node locations that support the greatest number of LOS wireless links are the best candidates for placement of the nodes of the wireless mesh network. As described, this can include selecting the N node locations with the most LOS wireless links.

It is to be understood that the first selection of the node placements may result is at least one stranded demand node. A stranded node is a node (generally, a demand node that is requesting access to the wireless mesh network) that is in a location where wireless coverage by the wireless mesh network is needed or required. However, the first selection of the node placement based on the number of LOS wireless links to the node locations may result in such a stranded demand node. At least some embodiments include identifying additional nodes placements from the first selection of node placements, wherein additional node placements are needed to satisfy the demands of a stranded demand node. That is, the additional node placements provide wireless coverage needed to satisfy the wireless network access of a stranded demand node. Without the presence of the stranded demand node, the additional node placements would not be required. The additional node placements through a second node location selection are additionally made to satisfy a hole in the coverage provided by the first selection of node placements.

Once the node placements have been selected (first and second selections), at least some embodiments include deploying a wireless mesh network including placing nodes of the wireless mesh network at the first selected node placements and at the second selected node placements. This include placing and/or activating the wireless access nodes at the selected node locations.

Figure 10:
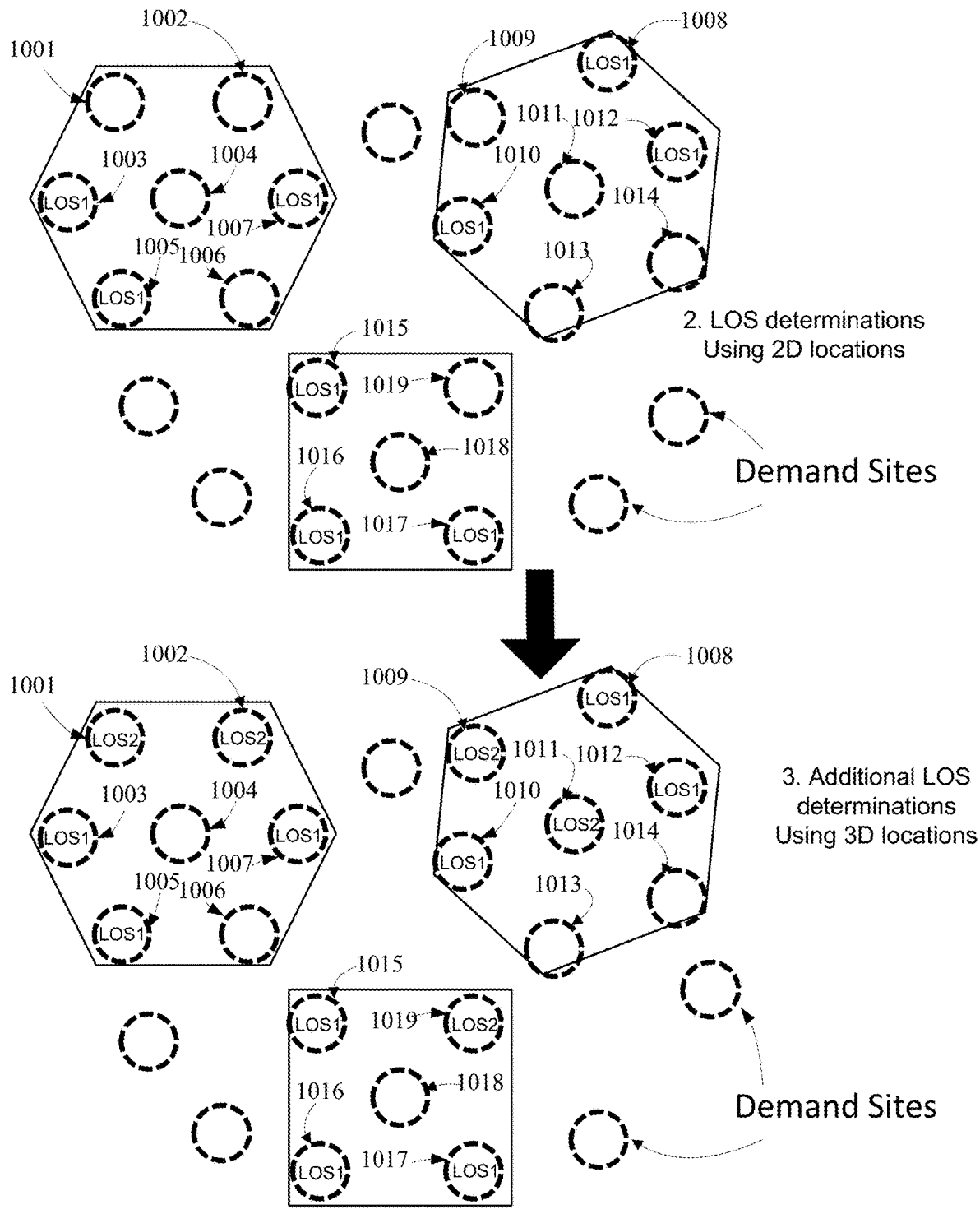
FIG. 10 shows additional LOS nodes of the remaining available locations that are determined using a three-dimensional analysis, according to an embodiment.

FIG. 10 shows available locations 1001-1019 for placing nodes of a wireless mesh network, and line-of-sight (LOS) nodes of the available locations which are determined using a two-dimensional analysis, according to an embodiment. An embodiment includes obtaining the locations 1001-1019 available for placing nodes of a wireless mesh network, wherein each of the locations include at least a longitude, a latitude, and an elevation. Further, for each pair of available locations, two-dimensional locations of possible obstructions between the pair of available locations are looked up, and candidate obstructions are identified for each of the possible obstructions based on the two-dimensional locations of the possible obstructions and two-dimensional locations of the pair of available locations.

As shown at step 1, available node locations 1001-1019 are identified. This may also include demand sites which are devices that demand access to the wireless network but are not nodes of the network. The demand sites are noted because the selected nodes need to provide wireless connectivity to the demand sites.

From the available nodes, a step 2 includes determining line-of-sight (LOS) nodes of the available locations using a two-dimensional analysis. As previously described, for an embodiment, identifying candidate obstructions from the possible obstructions based on the two-dimensional locations of the possible obstructions and two-dimensional locations of the pair of available locations includes identifying two-dimensional coverage areas of the possible obstructions, and identifying candidate obstructions as possible obstructions that have two-dimensional coverage areas that overlap a two-dimensional approximation of a line-of-sight between the pair of available locations.

Further, as previously described, for an embodiment, if the two-dimensional coverage areas do not overlap with the two-dimensional approximation of a line-of-sight between the pair of available locations, then the pair of available location are identified as having a LOS (line-of-sight) wireless link.

FIG. 10 shows additional LOS nodes of the remaining available locations that are determined using a three-dimensional analysis, according to an embodiment. That is, the step 2 identified node locations, such as, node locations 1003, 1005, 1007, 1008, 1010, 1012, 1015, 1016, 1017, that have one or more LOS wireless links. Step 3 include determining other node locations that have LOS wireless links using a more comprehensive three-dimensional analysis, such as, node locations 1001, 1002, 1009, 1011, 1019.

Figure 11:
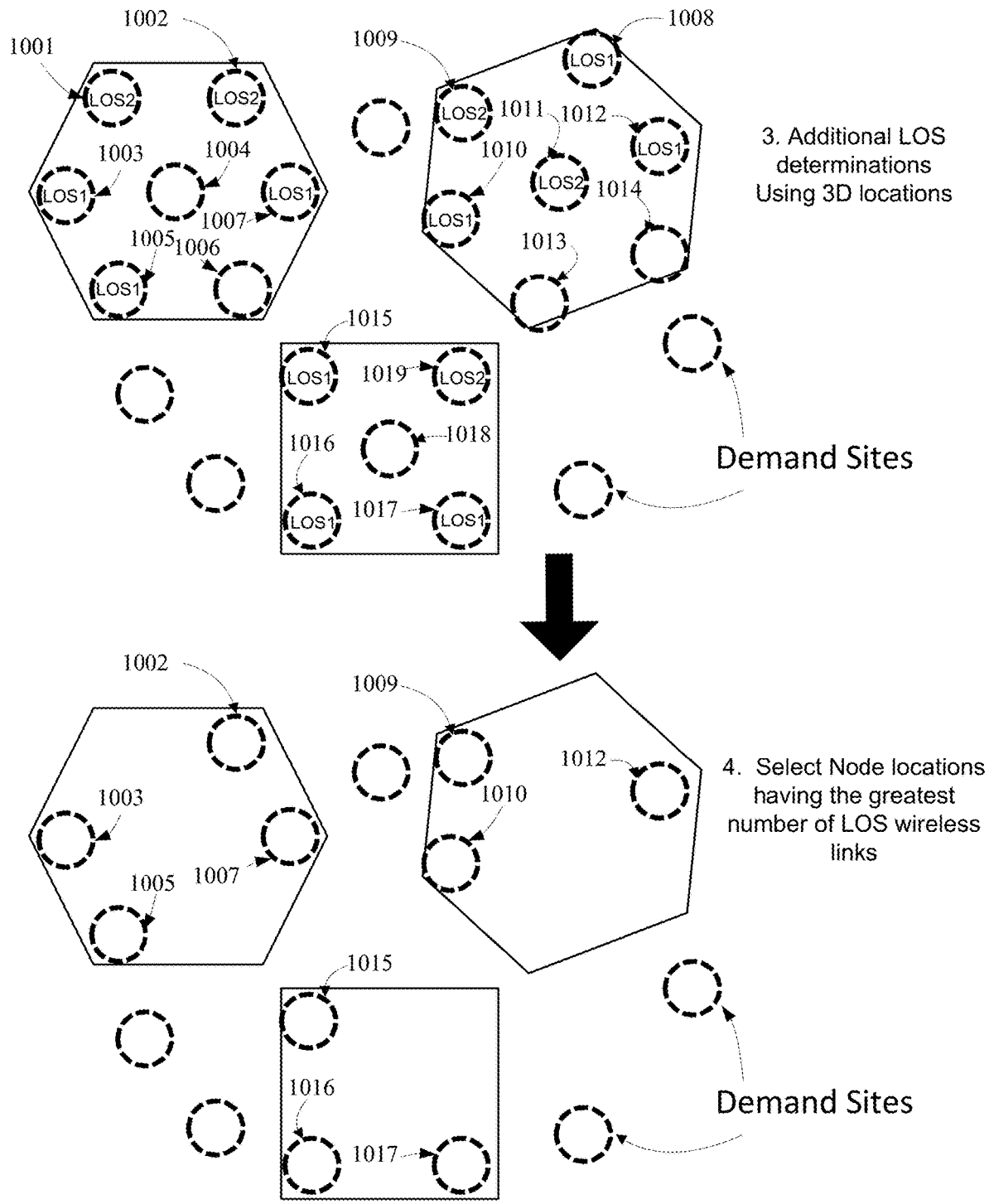
FIG. 11 shows selecting LOS nodes that have relatively large number of available LOS wireless links, according to an embodiment.

FIG. 11 shows selecting LOS nodes that have relatively large number of available LOS wireless links, according to an embodiment. As previously stated, step 3 includes determining other node locations that have LOS wireless links using a more comprehensive three-dimensional analysis, such as, node locations 1001, 1002, 1009, 1012, 1019. After completion of step 3, node locations 1001, 1002, 1003, 1005, 1007, 1008, 1009, 1010, 1011, 1012, 1015, 1016, 1017, 1019 that have LOS wireless links have been determined. From this node locations that have LOS wireless links, an embodiment (a fourth step) includes selecting node locations having the most LOS wireless links. That is, during the process of determining the node location that have LOS wireless links, at least a subset of the nodes will be determined to have multiple LOS wireless links. That is, most of the node locations will be included in multiple of the selected pairs of node locations that are determined to have LOS wireless links.

Selecting the node locations having the most LOS wireless link can be realized in one or more of several ways. One embodiment includes first selecting node placements for the available locations that have greater than a threshold number of line-of-sight wireless links. That is, for example, the first selection may include node location having at least two LOS wireless links. Another embodiment includes first selecting node placements for the available locations for the available locations have the greatest number of line-of-sight wireless links. Another embodiment includes first selecting node placements for the available locations for N of the available locations that have the greatest number of line-of-sight wireless links. That is, for example, the 20 node locations having the greatest number of LOS wireless links may be selected. As shown in FIG. 11, node locations 1002, 1003, 1005, 1007, 1009, 1010, 1012, 1015, 1016, 1017 may be selected as a set of node locations having the greatest number of LOS wireless links.

Figure 12:
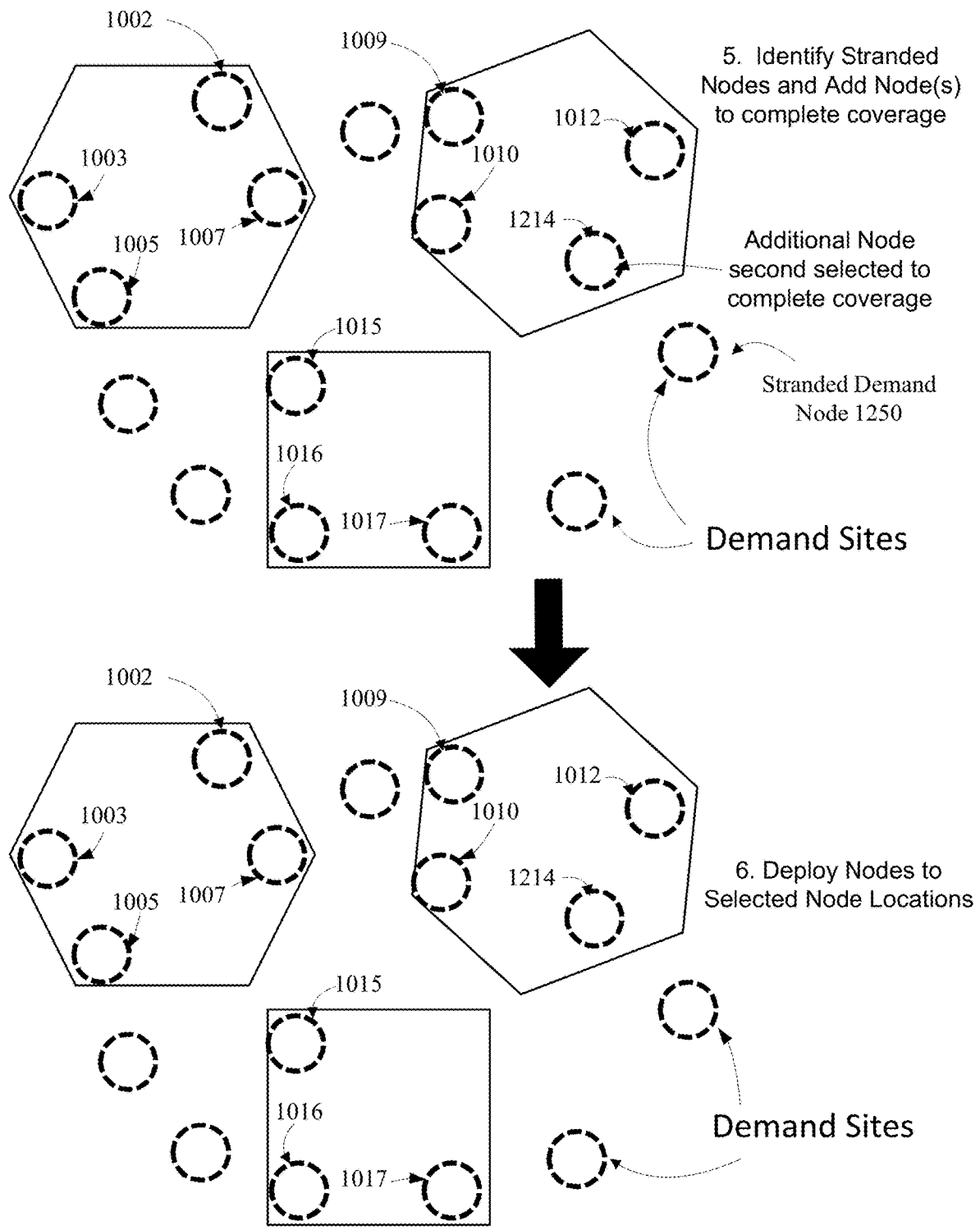
FIG. 12 shows a stranded node that may result from the selections of available locations for node placement, shows the selecting of additional node placements from the available nodes for providing line-of-sight wireless links to the stranded node, and further shows a deployed network based on the selected node location, according to an embodiment.

FIG. 12 shows a stranded demand node 1250 that may result from the first selections of available locations for node placement, shows the selecting of an additional node placement 1214 from the available nodes for providing line-of-sight wireless links to the stranded demand node 1250, and further shows a deployed network based on the selected node locations, according to an embodiment. The first selection process in which node locations having the greatest number of LOS wireless links can result in portions of the wireless mesh network having areas that are not provided with wireless coverage. For example, some of the demand sites may not be able to receive wireless network coverage after the first selection of node locations. FIG. 12 shows a stranded demand node 1250. A demand node is not a network node or an available node location. Rather, the demand nodes are devices demanding access to the wireless mesh network. As described, after the first selection of the available node locations, a coverage of the wireless mesh network using the first selection available node locations can be determined. If a known demand node falls outside of the coverage of node at the first selected node locations, then additional nodes are selected through a second selection that fill any holes or lack of wireless coverage areas that have stranded a demand node (such as stranded demand node 1250). In FIG. 12, an additional node 1214 is second selected to satisfy the demand of the stranded demand node 1250.

Although specific embodiments have been described and illustrated, the embodiments are not to be limited to the specific forms or arrangements of parts so described and illustrated. The described embodiments are to only be limited by the claims.

What is claimed:

1. A method comprising:
   obtaining locations available for placing nodes of a wireless mesh network, wherein the locations include at least a longitude, a latitude, and an elevation;
   for pairs of available locations,
      looking up two-dimensional locations of possible obstructions between a pair of available locations;
      identifying candidate obstructions from the possible obstructions based on the two-dimensional locations of the possible obstructions and two-dimensional locations of the pair of available locations;
      estimating a reference height associated with a shortest distance between a segment between the pair of available locations and a three-dimensional location of the candidate obstructions;
      determining a distance between a point on the segment as defined by the reference height and the three-dimensional location of the possible obstructions; and
      identifying the pair of available locations as having a line-of-sight wireless link based on the determined distance of the candidate obstructions.

2. The method of claim 1, wherein the identifying the pair of available locations as having a line-of-sight wireless link based on the determined distance of the possible obstructions includes identifying the pair of available locations as having the line-of-sight wireless link if the determined distance for the candidate obstructions is greater than a reference radius.

3. The method of claim 1, wherein the identifying candidate obstructions from the possible obstructions based on the two-dimensional locations of the possible obstructions and the two-dimensional locations of the pair of available locations further comprises:
   identifying two-dimensional coverage areas of the possible obstructions; and
   identifying the candidate obstructions as possible obstructions that have two-dimensional coverage areas that overlap a two-dimensional approximation of a line-of-sight between the pair of available locations.

4. The method of claim 3, wherein if the two-dimensional coverage areas do not overlap with the two-dimensional approximation of the line-of-sight between the pair of available locations, then facilitating the identifying the pair of available locations as having the line-of-sight wireless link.

5. The method of claim 4, further comprising first selecting node placements for the pair of available locations based on a number of line-of-sight wireless links associated with the pair of available locations.

6. The method of claim 5, further comprising the first selecting node placements for the pair of available locations that have greater than a threshold number of line-of-sight wireless links.

7. The method of claim 5, further comprising the first selecting node placements for the pair of available locations have a greatest number of line-of-sight wireless links.

8. The method of claim 5, further comprising the first selecting node placements for the pair of available locations for N of the pair of available locations that have a greatest number of line-of-sight wireless links.

9. The method of claim 5, further comprising:
   identifying stranded demand nodes from the first selecting node placements, wherein the stranded demand nodes have no line-of-sight wireless links; and
   second selecting node placements from available nodes for providing line-of-sight wireless links to the stranded demand nodes.

10. The method of claim 8, further comprising deploying the wireless mesh network comprising placing nodes of the wireless mesh network at the first selecting node placements and at the second selecting node placements.

11. A system comprising:
    a system server, the system server operating to:
    obtain locations available for placing nodes of a wireless mesh network, wherein the locations include at least a longitude, a latitude, and an elevation;
    for pairs of available locations,
       look up two-dimensional locations of possible obstructions between a pair of available locations;
       identify candidate obstructions from the possible obstructions based on the two-dimensional locations of the possible obstructions and two-dimensional locations of the pair of available locations;
       estimate a reference height associated with a shortest distance between a segment between the pair of available locations and a three-dimensional location of the candidate obstructions;
       determine a distance between a point on the segment as defined by the reference height and the three-dimensional location of the possible obstructions; and
       identify the pair of available locations as having a line-of-sight wireless link based on the determined distance of the candidate obstructions.

12. The system of claim 11, wherein the identify the pair of available locations as having the line-of-sight wireless link based on the determined distance of the possible obstructions includes identifying the pair of available locations as having the line-of-sight wireless link if the determined distance for the candidate obstructions is greater than a reference radius.

13. The system of claim 11, wherein the identify candidate obstructions from the possible obstructions based on the two-dimensional locations of the possible obstructions and the two-dimensional locations of the pair of available locations further comprises:

identifying two-dimensional coverage areas of the possible obstructions; and identifying the candidate obstructions as possible obstructions that have the two-dimensional coverage areas that overlap a two-dimensional approximation of a line-of-sight between the pair of available locations.

14. The system of claim 13, wherein if the two-dimensional coverage areas do not overlap with the two-dimensional approximation of the line-of-sight between the pair of available locations, then facilitating the identify the pair of available locations as having the line-of-sight wireless link.

15. The system of claim 14, wherein the system server operating further operates to first select node placements for the pair of available locations based on a number of line-of-sight wireless links associated with the pair of available locations.

16. The system of claim 14, wherein the system server operating further operates to first select node placements for the pair of available locations that have greater than a threshold number of line-of-sight wireless links.

17. The system of claim 14, wherein the system server operating further operates to first select node placements for the pair of available locations that have a greatest number of line-of-sight wireless links.

18. The system of claim 14, wherein the system server operating further operates to first select node placements for the pair of available locations for N of the pair of available locations that have a greatest number of line-of-sight wireless links.

19. The system of claim 15, wherein the system server operating further operates to:

identify stranded demand nodes from the first select node placements, wherein the stranded demand nodes have no line-of-sight wireless links; and second select node placements from available nodes for providing-line-of-sight wireless links to the stranded demand nodes.

20. The system of claim 18, wherein the system server operating further operates to deploy the wireless mesh network comprising placing nodes of the wireless mesh network at the first select node placements and at the second select node placements.

* * * * *